United States Patent

[11] 3,545,806

[72] Inventor  Pierre Ventre
               Billancourt, France
[21] Appl. No. 709,725
[22] Filed     March 1, 1968
[45] Patented  Dec. 8, 1970
[73] Assignees Regie Nationale Des Usines Renault,
               Billancourt, France, and
               Automobiles Peugot,
               Paris, France
[32] Priority  April 5, 1967
[33]           France
[31]           No. 101645

[54] ELECTRIC CURRENT SUPPLY SYSTEMS
     4 Claims, No Drawings
[52] U.S. Cl. .................................................. 296/137,
                                                       191/22
[51] Int. Cl. .................................................. B60j 7/02

[50] Field of Search .............................................. 191/22;
                                                        296/137, 137(G)

[56]              References Cited
              UNITED STATES PATENTS
2,973,991  3/1961  Werner ....................... 296/137X
3,056,628  10/1962 Golde ......................... 296/137X Primary Examiner—Duane A. Reger
Attorney—Stevens, Davis, Miller and Mosher ABSTRACT: Device for supplying electric current to a motor mounted on a movable panel and adapted to drive said panel, characterized in that a set of pivotally-mounted collector-shoes carried by the movable panel and electrically connected to the motor mounted on said panel, are constantly urged by resilient means against current-supplying slide-bars forming an integral part of an assembly solid with the fixed structure in which said movable panel is adapted to travel.

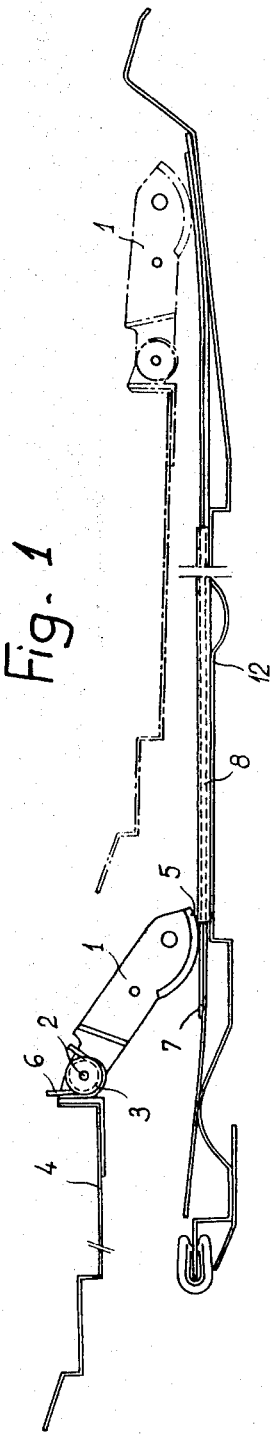
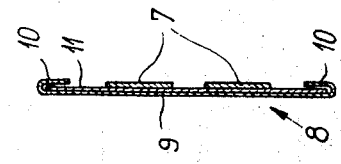
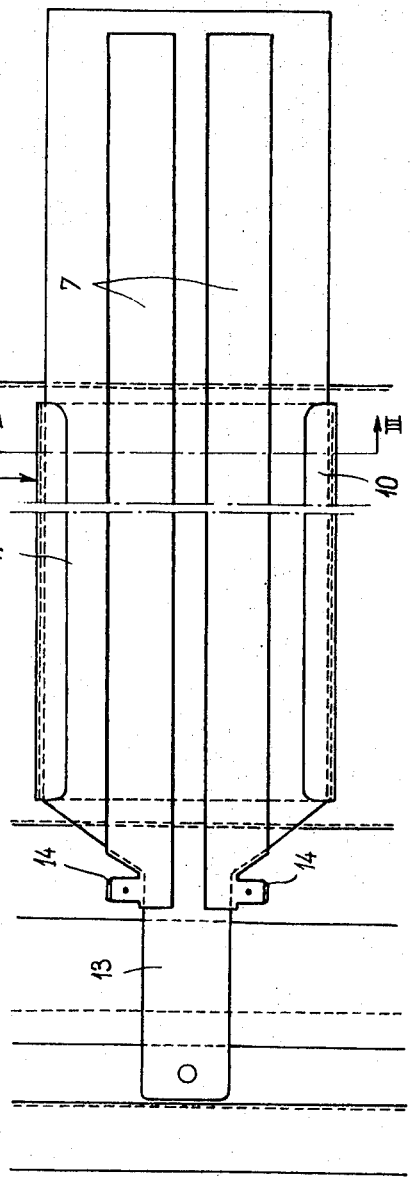

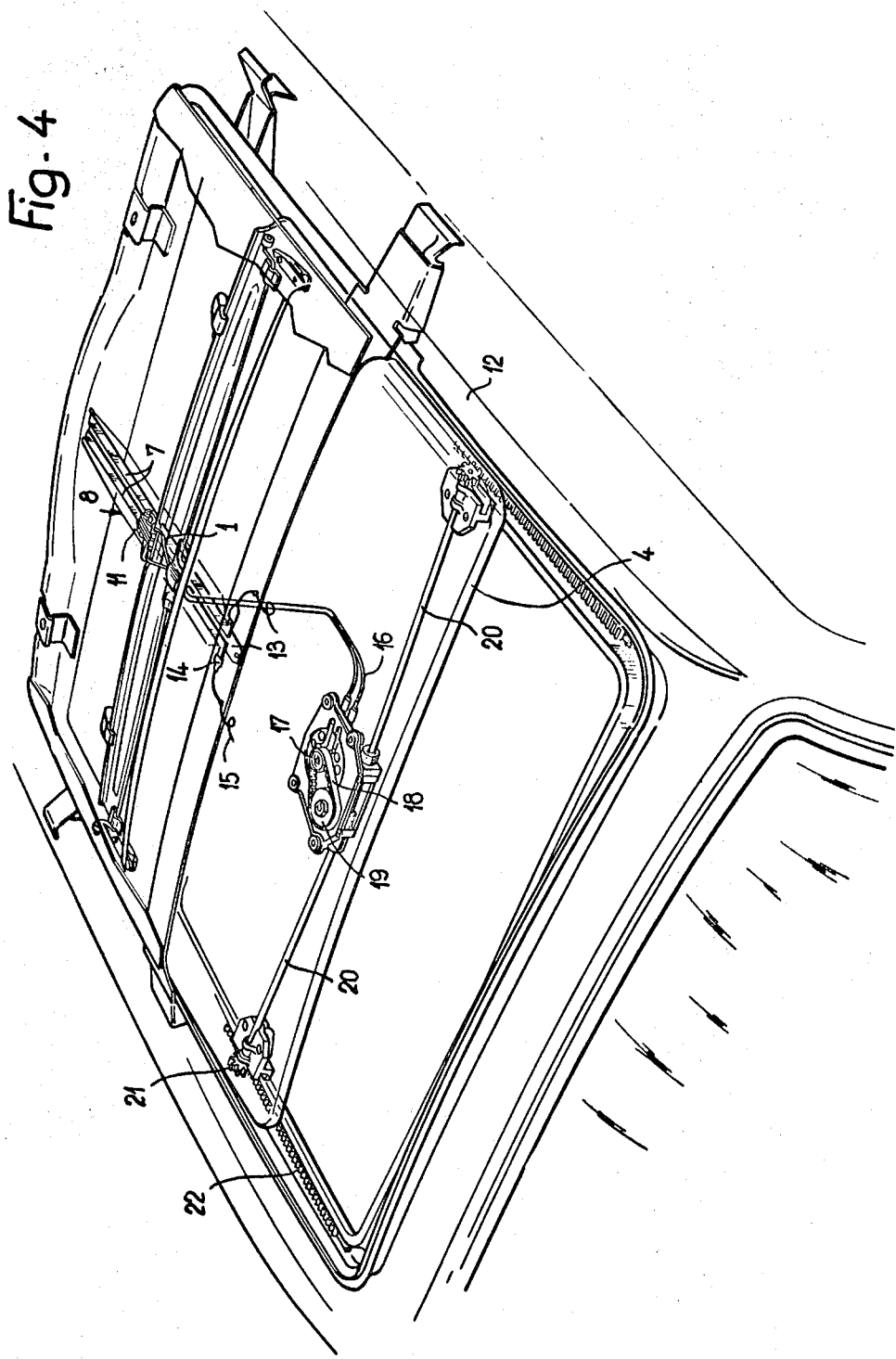

ELECTRIC CURRENT SUPPLY SYSTEMS

The present invention relates to a device for supplying electric current to a motor mounted on a movable panel driven thereby.

The problem consisting in supplying electric current to an electric motor movable with the panel to which it is secured and which is driven by said motor for linear or other motion is particularly difficult to solve in the specific case of an automotive vehicle in which, for instance, the movements of a sliding-roof panel are controlled by using a small electric motor. In fact, in this case the use of movable feed conductors cannot be contemplated on the one hand for obvious safety reasons and to avoid any unpleasant noise, and on the other hand to avoid excessive overall dimensions, since a particularly compact assembly is highly desirable. Besides, the system contemplated must be easily accessible to permit the normal maintenance and the removal thereof without interfering with the upholstery.

It is the object of the present invention to provide a current supply device capable of eliminating the inconveniences set forth hereinabove. This device is characterized in that it comprises a set of pivotally-mounted, spring-loaded collector-shoes carried by the movable panel and electrically connected to the electric motor mounted on said panel, and resiliently urged for constant engagement with current-supplying slide-bars forming an integral part of the fixed structure on which said movable panel is adapted to travel.

In order to afford a clearer understanding of this invention, a typical form of embodiment will now be described by way of example with reference to the accompanying drawing illustrating a sliding-roof structure; in the drawing:

FIG. 1 is an elevational view of the current supply device;

FIG. 2 is a plan view from above of same;

FIG. 3 is a section taken along the line III–III of FIG. 2; and

FIG. 4 is a perspective view showing a movable panel of a car roof with the current supply device connected to the motor controlling the panel translation.

Referring first to FIG. 1, it will be seen that collector-shoes 1 (three in the example illustrated) are pivotally mounted on pins 2 carried by straps 3 rigid with the movable panel 4 for example of a sliding roof of automotive vehicle. Each collector-shoe 1 consisting mainly of insulating material carries at its free end a slider 5 of electrically conducting material. Each slider 5 is connected by a wire 16 to the electric motor 17, shown in FIG. 4, mounted in a known manner on the movable panel 4 and adapted to drive same. For this purpose, the motor 17 drives, by means of a belt 18, a reduction gear 19 connected to one end of each of two shafts 20 the other ends of which have pinions 21 fixed thereon and adapted to move on racks 22 which are solid with the fixed roof structure on each side of the roof aperture. A hairpin spring 6 housed in the strap 3 constantly urges the collector-shoe downwardly by pressing the slider 5 against a current supply slide-bar 7. The endmost position of the movable panel 4 with one of its collector-shoes 1 is shown in dash-and-dot lines in the drawing.

The slide-bar 7 is an integral part of an assembly 8 comprising, as shown in FIGS. 2, 3 and 4, a support 9 consisting of a metal section formed with doubled-over edges 10 receiving therein a plate 11 of insulating material, and at least two slide-bars 7 consisting of spaced parallel strips of electrically conducting material, which are secured to said insulating plate through any suitable and known means. The assembly 8 is secured to the fixed roof structure 12 of the vehicle, the fastening means thereof being omitted for the sake of clarity.

The insulating plate 11 with the slide-bars 7 projects from either end of section 9 and is upswept along the fixed portion 12 of the vehicle roof, and comprises on one side a fastening lug 13.

One end of each slide-bar 7 has cut or otherwise formed therein a lateral lug 14 constituting a terminal adapted to be connected to a supply wire 15.

The current flow which controls the direction of rotation of the motor and therefore the direction of translation of the panel may be reversed by switching means interposed either between the collector-shoes 1 and the motor, in case this motor is of conventional design and comprises electromagnetic field winding, or before the slide-bars 7 in case a permanent-magnet field motor is used, an alternate arrangement consisting in utilizing three slide-bars instead of two.

The width of these slide-bars 7 and the gap left between them are selected according to the degree of precision of the sliding movement performed by the sliding panel, and also to the length of these slide-bars as a function of the permissible panel movement.

The complete assembly can be removed without difficulty and without interfering with the interior upholstery of the vehicle.

Of course, various modifications and variations may be brought to the specific form of embodiment illustrated and described herein without departing from the spirit and scope of the invention as set forth in the appended claims.

I claim:

1. A device for supplying electric current to a motor mounted on a movable panel and adapted to drive said panel in translation on a fixed structure having an opening and thereby open and close said opening, said device comprising a set of collector-shoes pivotally mounted on said panel, means electrically connecting said collector-shoes to said motor, a current supplied slide-bar assembly solid with said fixed structure and resilient means to constantly bias said collector-shoes against said slide bar assembly.

2. A device according to claim 1 further comprising straps carried by said movable panel, pins mounted in said straps, said collector-shoes being pivotally mounted on said pins.

3. A device according to claim 2, wherein said resilient means is a hairpin spring housed in said strap for biasing said collector-shoe against said slide-bar.

4. A device according to claim 1 wherein said slide-bar assembly comprises a metal section having doubled-over edges, a plate of insulating material with marginal portions engaged in said doubled-over edges, and at least two slide-bars consisting of spaced parallel metal-strips designed for supplying current to said collector-shoes, said slide-bars being secured to said insulating plate.